Patented Aug. 9, 1927.

1,638,108

UNITED STATES PATENT OFFICE.

ALBERT BARNES-THOMAS, OF DRESDEN, GERMANY, ASSIGNOR TO MARVLE PRODUCTS LIMITED, OF LONDON, ENGLAND, A BRITISH COMPANY.

METHOD OF PRODUCING ARTICLES FROM COMPOSITIONS OF MATTER.

No Drawing. Application filed June 3, 1924, Serial No. 717,547, and in Great Britain February 14, 1924.

This invention relates to a method of producing in a simple and inexpensive manner imitation marble, tiles, slabs or other like articles for various uses and purposes.

According to this invention particles or small pieces of the material or materials to form the basis of the article or mass are mixed with casein or other albuminous substance or agglutinant.

For the production of articles such as tiles or imitation marble, cement or the like, such as used in the production of concrete or building materials is mixed with the casein or the like with or without colouring matter and the production of such articles to which the present invention especially relates will be hereinafter fully described. It is to be understood however that various other materials or substances may be mixed or combined with casein or the like, such as saw dust, ground cork, ground oyster shells, metallic particles, marble or stone chips, according to the kind of article or product to be made and any of such substances may be used with or without the inclusion of cement or the like. The article or product may be produced in such manner as to have a highly glazed surface or facing in one or more colours and with various regular or irregular designs or patterns thereon. Broadly stated the method of producing the article or product consists in applying the mixture in a fluid state to a moulding surface or the like which may be smooth polished or otherwise according to the kind of surface or facing required on the finished article. For instance the mixture may be applied in layers to a glass or similar surface, the colouring matter being generally introduced into the mixture which is to form the initial layer or layers and finally a backing may be formed by a further application to the basic mixture which is generally uncoloured and contains materials such as are used in the production of concrete.

According to one method of carrying out this invention water (say about 4½ gallons) is heated to a temperature of about 120° to 150° F. and to this is added a solvent such as ammonia, (say about 14 fluid ounces) or borax (say about 21 ounces) for dissolving casein and finally the casein (say about 11 pounds) is added the whole being thoroughly stirred. Any suitable solvent for the casein having regard to the purpose in view may be used and the liquid containing the casein in solution may be prepared in large quantities ready for use and when it is required to produce the articles, a quantity of this liquid is taken and to it is added the other materials or substances. For instance cement of a superior grade may be added in such proportion as to enable the resultant mixture to have a consistency that will enable it to be readily and evenly applied to a glass or other moulding surface. Suitable colouring matter such as earth pigments may also be added if and when desired. This mixture may be sprayed, painted or otherwise applied to the moulding surface, and afterwards a further quantity of the mixture containing sand may be applied to or superimposed on the previous layer or layers, this mixture containing if desired suitable colouring matter and serving to impart bulk or a definite thickness to constitute what may be regarded as the facing to which is then applied in any appropriate manner, a further quantity of the said mixture containing casein and cement, with the addition of sand, ballast, stone chips or similar materials used in making concrete, to form a backing. This backing in some instances might not be required as the layers forming the facing may be made sufficiently thick to enable the product when set to be used for some purposes for example as a kind of surfacing for application to other backings. Generally however the product is made with the backing prepared from the mixture of casein and cement and other materials such as referred to above. The surface of the facing may be treated with a hardening and water proofing substance which improves it in many respects as hereinafter referred to and this may be carried out in different ways but usually after the mass has been moved out of contact with the moulding surface. The precise method of procedure in carrying out the invention varies according to the kind of article to be produced or to the kind of design or pattern which is to be provided on the article or product. For instance in the production of imitation marble the liquid containing the casein in solution to which cement and a colouring matter have been added to form the initial or facing mixture is painted, sprayed or otherwise applied to the smooth or polished moulding surface. A further quantity of the said mixture containing sand and a different colouring matter may be superimposed at different places on the previous layer whilst still fluid with sufficient force as to displace portions of the initial layer, so that the colour of the second application will show through or between the displaced portions of the initial layer and by this procedure a graining, mottled or similar effect or pattern can be produced to represent imitation marble or the like. Patches, streaks or lines of other colours may be produced for example by painting or spraying quantities of the said facing mixture containing the desired colouring matter prior to the application of the mixture containing the sand. Finally the backing mixture containing cement (which may be coarser than that used in the facing mixture) and sand, ballast, stone chips or the like may be applied to the previous layers before the latter have set. In making articles such as single coloured tiles the initial layer which may contain the desired colour may be applied to the glass moulding surface and upon this layer is superimposed the same mixture containing however sand or the like and the bulk of the colouring matter, the backing mixture then being applied if desired.

In the case of producing articles such as tiles, panels or the like having a regular design or pattern in colours, initial layers of the facing mixture containing the different colours may be placed in different positions or superimposed on the glass moulding surface and the said mixture containing also sand to complete the formation of the facing may then be applied upon which may be placed the backing mixture. After the various layers have been applied the mass is allowed to set and owing to the same basic mixture of cement and casein being used in the various layers a homogenous mass is produced which after setting is removed from the moulding surface, the removal being readily effected owing to the presence of the casein in the mixture. No special grinding or polishing operation is necessary and a non-porous facing or surface can be produced on the product which is weather resisting, hard and durable. For hardening the facing or surface of the product it may be treated with a bituminous substance and in this respect a liquid substance may be used, the surface being washed or rubbed with the liquid. This has the effect of hardening the surface and rendering it more weather resisting and durable without detrimentally affecting the glaze or finish. This operation or step may be carried out after setting of the mass and preferably after complete removal from the mould. The water which is used must be clean and suitable for ensuring proper mixing with and setting of the cement.

The mould which is used may be of any suitable construction and may be provided with a glass surface or surfaces according to the parts of the product which are to have the glazed surfaces. In the production of slab-like articles the mould may be in the form of a kind of tray having a glass bottom on which the mixture is applied. The moulding surface may be of curved angular or irregular form according to the required shape of the product and in some cases it need not be smooth or polished. The product is especially useful as an electrical insulating material and can be used as a substitute for marble, slate or the like in switch board construction. Articles to take the place of pottery or ceramic ware can be produced according to this invention by the use of suitable glazed or other moulds. The product although being hard can be readily drilled and worked and if made in slabs or sheets it can be readily cut or divided into sections of the required size.

What I claim and desire to secure by Letters Patent of the United States is:—

1. A method of producing imitation marble, tiles, slabs or the like, comprising applying to a molding surface a substance substantially free from gritty material and containing a substantial percentage of casein to act as a glazer, then applying to said first substance a base material to form an integral mass.

2. A method of producing imitation marble, tiles, slabs, or the like, comprising applying to a molding surface a substance substantially free from gritty material and containing a substantial portion of casein to act as a glazer, then applying to said first material a base material containing casein, the casein in the latter material acting as a binding agent, and permitting said materials to set to form an integral mass.

3. A method of producing imitation marble, tiles, slabs or the like, consisting in applying a fluid mass containing dissolved casein, cement and water, with or without coloring matter, to a molding surface to form an initial layer, and applying a further quantity of the mixture with or without sand or other material, the latter application containing coloring matter which shows through the initially applied layer.

4. A method of producing imitation marble, consisting in applying to a smooth or polished molding surface, a mixture of water, dissolved casein and cement, with or without a coloring matter, to form an initial layer, and applying a further quantity of the mixture, having a different coloring matter, with sufficient force to displace the initial layer so that the color of the second application will show through or between the displayed portions of the initial layer to produce a grained, veined, mottled, or similar effect or pattern.

5. A method of producing imitation marble, consisting in applying to a smooth or polished molding surface a mixture of water, dissolved casein and cement, with or without a coloring matter, to form an initial layer, applying a further quantity of the mixture, containing also sand and a different coloring matter, with sufficient force to displace the initial layer so that the color of the second application will show through or between the displaced portions of the initial layer to produce a grained, mottled or similar effect or pattern, and applying a further quantity of the mixture containing cement of any fineness of division together with filling material such as sand, ballast, stone chips, or the like.

ALBERT BARNES-THOMAS.